Nov. 18, 1930.  J. A. JOHNSON  1,781,924
STRAIGHT LINE TRANSMISSION
Filed Aug. 20, 1927   2 Sheets-Sheet 2
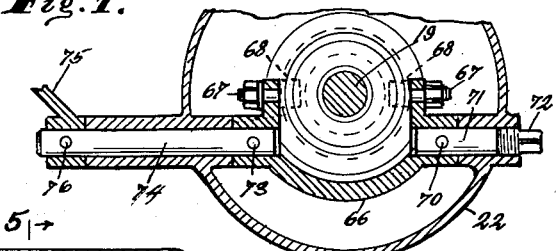
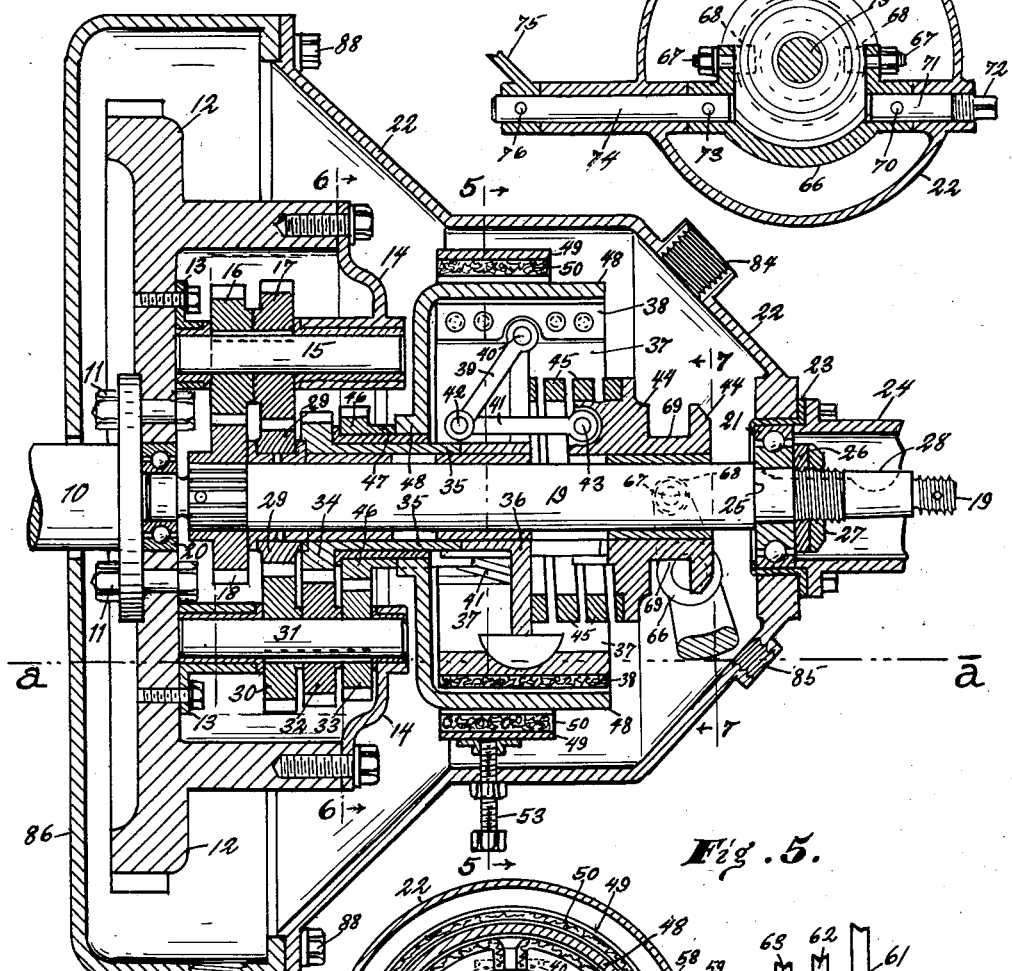
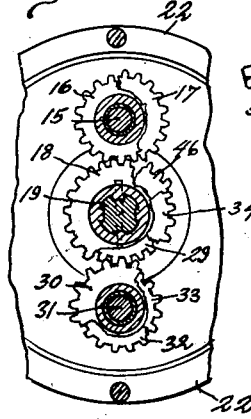
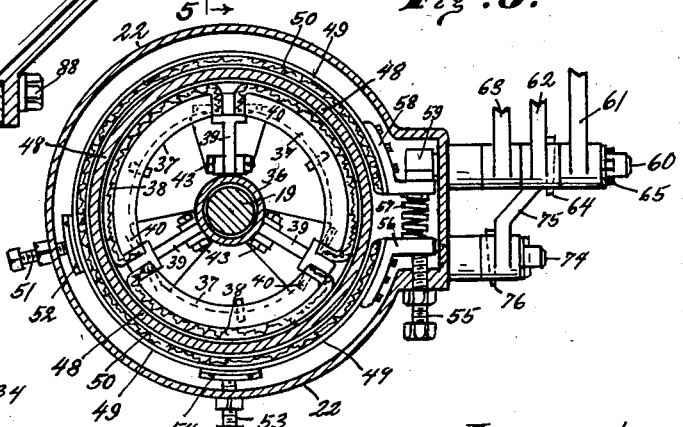
Inventor.
James A. Johnson.
by
William M. Gantle.
His Attorney.

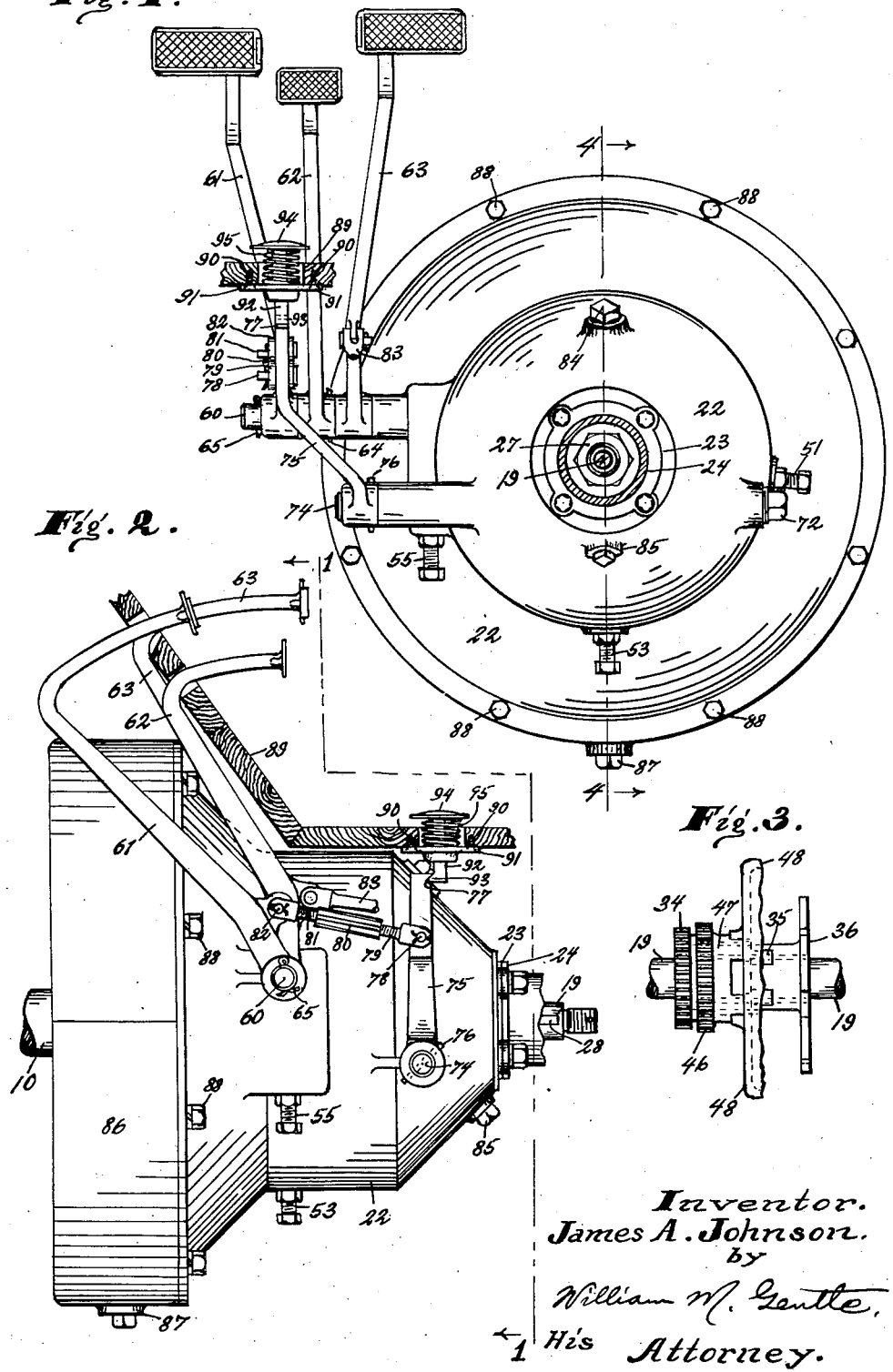

Patented Nov. 18, 1930

1,781,924

UNITED STATES PATENT OFFICE

JAMES A. JOHNSON, OF LOS ANGELES, CALIFORNIA, ASSIGNOR TO ANNIE W. STIMSON, OF LOS ANGELES, CALIFORNIA

STRAIGHT-LINE TRANSMISSION

Application filed August 20, 1927. Serial No. 214,333.

This invention relates to means for transmitting power from one element to another, and is especially adapted for use in automobiles and the like in which it is desirable to transmit power in a straight line from the engine or driver shaft to the driven shaft, and an object of this invention is to construct the apparatus so that power can be transmitted at a reduced speed from the driver to the driven shaft without the assistance of stationary elements. That is, the apparatus is so constructed and the parts thereof so arranged that by the operation of a single lever a speed ratio of one to one can be automatically established between the driver and driven shafts with means connected thereto for commencing the drive at a speed ratio below a one to one ratio.

A further object is to provide means adapted to automatically transmit power from element to element or shaft to shaft in a gradually increasing ratio of speed from low speed to a one-to-one ratio and to change the driving speed ratio when the speed falls below said ratio.

Another object of this invention is to provide means for automatically transmitting power at a reduced speed from a driving to a driven shaft without pulling the driver below its most efficient torque pull or power; and a further object is to so construct and arrange the parts of said means that it can be adapted to use in all sorts of machinery, appliances or vehicles in which power is transferred from element to element or shaft to shaft.

Another object of the invention is to provide a straight line transmission adapted to transmit power at reduced speed from shaft to shaft without the aid of shifting gears.

A feature of the invention is shown in the construction, arrangement and operation of the transmission in which there is a planetary drive shaft for carrying the load and a corresponding auxiliary planetary shaft for controlling the load.

Features of invention are shown in the construction, combination and arrangement of parts whereby a transmission is provided that is free of stationary back stops.

A further object is to provide a transmission in which the driven shaft can be reversed while driven at its various speeds forward.

Other objects, advantages and features of invention may appear from the accompanying drawing, the subjoined detailed description and the appended claims.

The accompanying drawings illustrate the invention in which:

Figure 1 is a sectional rear end view of a transmission as indicated by line 1—1 of Fig. 2 that is constructed in accordance with this invention.

Fig. 2 is a side view of the transmission showing part of an automobile floor in section.

Fig. 3 is a fragmental plan view of the drum and spider showing their splined connection to their associated gears.

Fig. 4 is an enlarged central longitudinal vertical section through the transmission.

Fig. 5 is a cross section on line 5—5 of Fig. 4 showing the internal brake and associated parts on a reduced scale.

Fig. 6 is a fragmental cross section on line 6—6 of Fig. 4 on a reduced scale.

Fig. 7 is another fragmental cross section on a reduced scale.

According to my invention I employ a planetary transmission to drive two coaxial members at different speeds of rotation on their common axis. If there were no possible connection between these two driven coaxial members, the transmission mechanism would simply drive them and no rotation would be imparted to the driven shaft, but I provide a controllable connection between these two coaxial driven members which is capable of slipping. For this purpose I prefer to employ a friction clutch construction, the effect of which is that when the friction clutch is slipping, transmission will be effected through the planetary gearing to the driven shaft at a reduced speed of rotation, and when the friction clutch is not slipping, the transmission will be effected at a one-to-one ratio. In other words, a reduction gearing carried by the planetary transmission operates as reduction gearing to transmit reduced speed driving when the clutch connection is slipping. When there is no slippage the reduction gearing becomes locked so that the driving pinions or gears of the planetary cage rotate the driven shaft in unison with the cage.

The transmission includes a driving member or shaft 10 attached by bolts 11 to a fly wheel 12. Bolted to the fly wheel are two carrying spiders 13 and 14 that form a planetary cage to support the planetary reduction gear shaft 15 that has pinions 16 and 17 attached thereto.

The planetary pinion 16 is of slightly smaller diameter than its companion pinion 17, and is in mesh with the driven gear 18 that is splined and pinned to the driven shaft 19. The driven shaft 19 is formed of one piece and has its drive end supported in a ball bearing 20 secured in the center of the fly wheel 12.

The rear end of shaft 19 is supported in a ball bearing 21 secured in the transmission housing 22. The top section of the roller bearing 21 is held in position by a flanged thrust ring 23 holding it against rear thrust and the universal cap 24 holds it against opposite thrust and the cap is bolted to the case 22. The inner circumference of the ball bearing 21 fits against a shoulder 25 of the load shaft 19, and is secured against the shoulder by a washer 26 and lock nut 27.

It is to be understood that the driven shaft 19 is in perfect alignment with the motor or driving shaft 10 and it has the load gear 18 attached to its front end; a coupling key way 28 is provided on the rear end for a universal joint not shown.

The pinion 17 may be called a thrust or back stop pinion and is in mesh with an idle gear 29 loosely mounted and free to rotate on the driven shaft. This last mentioned gear 29 is in mesh with a pinion 30 on a secondary or auxiliary planetary drive shaft 31.

This auxiliary drive shaft is carried in bushings by the carrying spiders 13 and 14 and is free to rotate and moves in the same arc as the planetary shaft 15. This auxiliary shaft is used exclusively for controlling the speed of the driving pinion or gear 16 when the shafts 10 and 19 are operating below a one to one ratio. The auxiliary planetary drive shaft 21 has three pinions or gears 30, 32 and 33 attached thereto. The second gear 32 is in mesh with a sun gear 34 mounted loosely and free to rotate on the driven shaft 19; and gear 34 has hub 35 extending to and splined to the hub of a brake spider 36 also loosely mounted and free to rotate on driven shaft 19. This brake spider 36 has three internal friction shoes or brake segments 37 attached to it that carry brake linings 38 secured to them by rivets or any other well known means.

Each segment 37 is provided with a lever loosely attached to it by a pin 40 so that as the segments 37 are moved outwardly they slide slightly on the pins to compensate for a changed position and so that they can as easily return to a normal position.

Links 41 are pivotally attached to the cam bars 39 by pins 42 and also have their other ends attached by pins 43 to a sliding collar or thrust spindle 44 that is bushed and free to rotate on driven shaft 19. A compression spring 45 is arranged between the brake spider 36 and thrust collar 44; and this spring 45 is adapted to set the internal brake, or clutch, segments 37 against the inner surface of a friction drum 48 and normally maintain a one to one speed ratio between the shafts 10 and 19 when the engine is running continuously in a forward direction.

The third pinion gear 33 on the auxiliary drive shaft 31 is in mesh with a sun gear 46 loosely mounted and free to rotate on the hub of the brake spider 35. The hub 47 of this gear is splined to a brake drum or clutch drum 48 that is also bushed and free to rotate on the hub of the brake spider gear 35. The brake drum 48 extends over the internal brake segments 37 in position to be engaged by the segments when they are thrust outwardly. When in operation the internal brake and brake drum form two forces that are used against each other and are carried through the auxiliary planetary drive on shaft 31 to the main planetary drive gear 16 on shaft 15.

It is to be understood that any kind of desired reduced drive ratio can be obtained by correctly selecting the number of teeth in the gears and that the teeth of all the gears cooperate to drive the driven shaft at all times, and the function of the internal brake segments 37 against the brake drum or clutch drum 48 is to regulate the driving speed ratio and when the brake segments 37 become locked to the brake drum 48 the transmission is locked in a unit so that in operation the shafts 10 and 19 move in a speed ratio of one to one. This clutch connection is constructed so that it is relatively weak, so that it will not prevent relative movement of the clutch parts at first when it has been closed.

When the static friction is broken between the segments 37 and drum 48 the transmission automatically begins to drive at a reduced speed without aid of stationary elements.

The reason for this is that there is a driving member 10 driving a reduction planetary set of pinions or gears and from those gears there is a connection to a second auxiliary set of planetary pinions or gears that terminates their connection at the friction connection composed of the brake drum or clutch drum 48 and internal brake segments 37. If the ratio of the diameters of gears on the auxiliary planetary set of gears is figured correctly the internal brake and brake drum will have to hold no more than the engine can pull under friction at normal speed so that when the reduced speed drive is superseded by it the brake will have locked the gears, so that the drive must be effected thereafter in a one to one ratio. After the brake segments 37 become locked to the brake drum they are therefore in static friction, that is to say, their relative movement is stopped by the friction. In other words, the friction developed will pull considerably more than the engine can pull. Therefore it will pull in a one to one ratio until the segments are released from the drum sufficiently to let friction start. For instance if a car is running up grade and it is desired to lower the ratio to enable the engine to make the grade the segments 37 are sufficiently released from the brake drum so that the transmission will find its own ratio to suit the grade.

In other words the transmission increases the "power arm" of the engine because it pulls through gears at a reduction in drive speed and is controlled by the gears themselves, during the driving.

When the transmission is locked in a one to one ratio the auxiliary planetary drive shaft 31 is arranged to pull equal with the main planetary drive shaft 15, but as soon as movement of the gear commences the auxiliary drive shaft loses about seventy-five per cent. of its pull on the engine through reduction to the internal brake and keeps on losing as the ratio decreases.

An external brake band 49 is mounted in position to engage the outside of the brake drum 48 and it is shown with brake lining 50 attached and held in a neutral position. This brake band 49 is supported by a lock bolt 51 through the side of transmission case 22 and has its inner end arranged between the two angles 52 riveted on brake band 49 to support the brake sideways and also there is a lock bolt 53 through bottom of case 22 that has its inner end arranged between two angles 54 riveted on brake band 41 to support and adjust the brake band from the bottom. Also there is a lock bolt 55 placed through case below carrying lug 56 to adjust the brake against wear; and a spring 57 is arranged between carrying lug 56 and operating lug 58 that is secured to the ends of the brake band. Pins are provided on the lugs 56 and 58 to center the spring that is adapted to hold the brake band in neutral position.

A cam 59 is arranged on top of operating lug 58 and adapted to set the brake band 49 when the shaft 60 is actuated by the foot pedals 62. There are three pedals 61, 62 and 63 on the shaft 60. The center foot pedal 62 is secured by a pin 64 to the shaft 60 for operating the cam 59 and the main operating pedal 61 and pedal 63 are both loose on the shaft, and are held in place by a cotter pin 65. The brake band 49 is used exclusively for reverse operation of the load shaft 19; and when it is set to the brake drum 48, the brake drum gear 46 becomes the guide for the reverse action of the internal brake which is held in a neutral position. It is to be understood that the reverse action is a set ratio and brought from stationary to the ratio of the gears by brake friction, the operation being entirely different for the go-ahead movement.

A rocker arm 66 is shown connected to thrust collar 44 by bolts 67 that have rollers 68 attached to them that are adapted to fit in a circular groove 69 in the thrust-collar. The rocker arm is supported by the case 22; and it has a stub shaft 71 secured to it by a pin 70 and the hole in which this stub shaft operates is closed by a pipe plug 72 to prevent oil leak.

Also an operating shaft 74 is secured by a pin 73 to the rocker arm 68, and an operating lever 75 is secured by a pin 76 to shaft 74.

This lever is connected by a pin 78 to a right-hand stub bolt 79, and the stub bolt 79 is connected to a right and left swivel 80 and on the opposite end of the swivel a left-hand stub bolt 81 is connected which is pinned by pin 82 to main operating pedal 61. This swivel is for the purpose of adjusting internal brake. On the car brake foot lever 63 is shown the car brake rod 83 that is adapted to set the car brakes.

The transmission case 22 is provided with pipe plug 84 through which the transmission is filled with oil. In the center of case 22 is shown pipe plug 85 for maintaining an oil level indicated by line a—a in Fig. 4, and on the bottom of the bell housing 86 is shown a pipe plug 87 through which the transmission housing 22 is drained.

The bell housing 86 is secured by bolts 88 to the transmission case 22. The floor 89 of the car is fragmentally shown in the drawings to which is attached by screws 90 a guide casting 91 which serves to guide and hold a plunger 92 which has a tooth 93 on the end of it for the purpose of engaging notch 77 on the upper end of the control lever 75 and holding it safely in the neutral position. This plunger 92 is fastened to a foot-cap 94 and a compression spring 95 is inserted between the foot cap 94 and guide casting 91 to hold it away from operating lever 95 while the pedal is in use.

The control lever 75 is released from a neutral position by actuating foot lever 61 which disengages the tooth 93 from the notch 77 and permits the plunger 92 to be forced upwardly by the spring 95.

In operation the transmission when installed on an automobile is to be maintained in a neutral position as indicated in the drawings, that is it is set and held in a position in which both the internal and external brake members are disengaged from the brake drum so that the engine can be started and operated without moving the car. In other words the transmission is in a neutral position when the tooth 93 on the stop latch is set in the notch 77 of the control lever and when this lever is released the transmission is ready to drive the car either forward or backward.

When the control lever is released the compression spring will cause the segments 37 to engage the inner wall of the drum 48 and establish a weak, slipping frictional pull that operates through the auxiliary planetary drive, which pull is continued through the teeth of the gears to the main drive gear 16 and controls it in all its speed ratios.

As soon as the segments 37 engage the brake drum 48 the engine begins to drive the car through reduction gearing gradually changing the driving ratio as the engine gains speed, to a full one to one speed ratio.

As soon as the power has reached a fixed or one to one ratio the transmission will pull at any speed about normal because the static friction of the internal brake can resist more than the pull of the engine.

If a condition is reached such as the car climbing a hill, navigating said roads or stuck in bogs, the pedal 61 is actuated sufficiently to release the brake segments 37 from the drum 48 to break the static and start sliding friction and then the transmission operating through the reduction gears will control the speed and apply the power in such a way as to propel the car. Also when the car is moving down a grade the internal brake will function to control and reduce the speed; and if necessary it will coact with the usual car brakes to retard or stop the car.

The car is reversed by operating the foot pedal 62 to set the external brake 49 on the brake drum 48 to hold it stationary which will cause the load shaft 19 to rotate in a direction reverse to the drive shaft 10.

As previously indicated this transmission is designed with the object of eliminating shifting gears; and is designed to be suited for attachment to the present day automobiles, and to that end it is constructed so that its working movements are in full harmony with the present automobile operation.

I claim:

1. In a planetary transmission mechanism, the combination of a driving member, a planetary cage carried thereby with planetary gear wheels, two coaxial members mounted to rotate on a common axis of rotation with means for driving the same through said gears to rotate them respectively at different speeds on their axes, a weak friction connection associated with said coaxial members to resist first, and then prevent, without stopping their relative rotation, said friction connection including a drum rotating in unison with one of said two coaxial members and friction shoes mounted for rotation with the other of said two coaxial members, hand-controlled means for pressing the shoes against the drum with a constant force, and a driven shaft driven through said gears, said parts co-operating to drive the driven shaft at a reduced speed through the gears when the said friction connection permits relative rotation between the said shoes and the said drum, and operating to drive the shaft at the same speed as the driving member when said shoes lock with the drum and prevent relative rotation of said two coaxial members.

2. In a planetary transmission mechanism, the combination of a driving member, a planetary cage carried thereby with planetary gear wheels, including two rigidly connected pinions, a driven shaft coaxial with the cage and having a gear wheel meshing with one of said pinions, two coaxial members with means for driving the same respectively at different speeds of rotation from the other of said rigid pinions, a weak friction clutch connection between said two coaxial members, including two engaging friction members with hand-controlled means for pressing the friction members against each other with a constant force, said friction clutch connection constructed to slip at first and thereby start the drive of the driven shaft at a reduced speed of rotation from the cage, and operating when the friction clutch connection is not slipping, to lock the rigid pinions against rotation on their own axes and thereby rotate the driven shaft at the same speed of rotation as the cage.

3. In a planetary transmission mechanism, the combination of a driving member, a planetary cage carried thereby with planetary gear wheels, including two rigidly connected pinions, a driven shaft coaxial with the cage and having a gear wheel meshing with one of said pinions, two coaxial members mounted for rotation on the axis of the driven shaft, a sun-gear rigid with one of said coaxial members, a sun-gear of a different diameter from the last-named sun-gear rigid with the other of said coaxial members, means for driving said sun-gears at different speeds respectively from the other of said rigid pinions, a weak friction clutch connection between said two coaxial members, including two engaging friction members with hand-controlled means for pressing the friction members against each other with a constant force, said parts co-operating when the friction clutch connection is slipping, to start the drive of the driven shaft from rest at a reduced speed of rotation from the cage while the clutch is slipping, and operating when the friction clutch connection is not slipping to lock the rigid pinions against rotation on their own axes, and thereby rotate the driven shaft at the same speed of rotation as the cage.

4. In a planetary transmission mechanism, the combination of a driving member, a planetary cage carried thereby with planetary gear wheels, two coaxial members mounted to rotate on a common axis of rotation with means for driving the same through said gears to rotate them respectively at different speeds on their axes, a relatively weak friction connection associated with said coaxial members constructed to resist at first without stopping their relative rotation, said friction connection including a drum rotating in unison with one of said two coaxial members and friction shoes mounted for rotation with the other of said two coaxial members, hand-controlled means for pressing the friction shoes against the drum with a constant force and a driven shaft driven through said gears, said parts co-operating to start the driven shaft from rest and drive the driven shaft first at a reduced speed through the gears when the said friction connection permits relative rotation between the said shoes and the said drum, and operating to drive the shaft at the same speed as the driving member when said shoes lock with the drum and prevent relative rotation of said two coaxial members, and a reverse band for holding the drum against rotation to enable the planetary cage to drive the driven shaft in a reverse direction.

5. In a planetary transmission mechanism, the combination of a driving member, a planetary cage carried thereby, two planetary pinions of different diameters rigid with each other and carried on said cage, a driven shaft coaxial with the cage, having a gear wheel meshing with the rigid pinion of smaller diameter, an idle sun-gear rotating freely on the driven shaft and driven by the rigid pinion of larger diameter, a planetary gear carried by the cage meshing with the idle sun-gear and driven thereby, a pair of pinions of different diameters rigid with the last-named planetary gear, a pair of sun-gears mounted to rotate on the axis of the driven shaft and meshing with the last-named pinions, a friction drum rigid with one of the last-named sun-gears, and friction shoes mounted for rotation with the other of the two last-named sun-gears, and means for controlling the shoes to apply them to the drum to develop friction, said parts co-operating when the shoes slip on the drum, to permit relative rotation of the idle sun-gear on the driven shaft and thereby effect transmission of rotation through the rigid pinions to the driven shaft at reduced speed with respect to the planetary cage, and operating when the shoes fail to slip, to lock the pinions of the planetary cage and transmit rotation from the cage to the driven shaft at a one-to-one ratio.

6. In a planetary transmission mechanism, the combination of a driving member, a planetary cage carried thereby, with planetary gear wheels, two coaxial members mounted to rotate on a common axis of rotation with means for driving the same through said planetary gear wheels to rotate the two coaxial members respectively at different speeds on their axis, a relatively weak friction connection associated with said coaxial members to resist their relative rotation, said friction connection including a drum rotating in unison with one of said two coaxial members, and movable clutch means mounted for rotation with the other of said two coaxial members, a driven shaft driven through said planetary gear wheels, a hand-operated member capable of assuming a "closed" position to close the friction connection, with a spring for holding said clutch means in contact with said drum when the hand-operated member is left in said "closed" position, said spring operating to permit slippage between the clutch means and the drum when the friction connection is fully closed by the hand-operated means to drive the driven shaft at a reduced speed through the said planetary gear and operating to drive the driven shaft at the same speed as the driving member when said clutch means becomes frictionally locked to the said drum, preventing relative rotation of said two coaxial members.

In witness whereof, I have hereunto affixed my signature.

JAMES A. JOHNSON.